United States Patent [19]
Eder et al.

[11] 3,723,471
[45] Mar. 27, 1973

[54] NOVEL BENZOPYRAN DERIVATIVES

[75] Inventors: Ulrich Eder; Gerhard Sauer, both of Berlin, Germany

[73] Assignee: Schering Aktiengesellschaft, Berlin, Germany

[22] Filed: Feb. 4, 1971

[21] Appl. No.: 112,764

[30] Foreign Application Priority Data

Feb. 6, 1970    Germany..................P 20 06 372.3

[52] U.S. Cl...........................260/345.2, 260/586 R
[51] Int. Cl. ..............................C07d 7/20
[58] Field of Search..................260/345.2

[56]              References Cited

FOREIGN PATENTS OR APPLICATIONS 97,827    1/1964    Denmark.........................260/345.2

Primary Examiner—John M. Ford
Attorney—Millen, Raptes & White

[57]              ABSTRACT

Benzopyrans of the formula

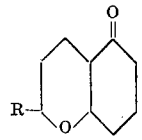

wherein R is lower-alkyl are useful as intermediates in the production of steroids, e.g., 4,9(10)-estradiene-3,17-dione.

8 Claims, No Drawings

NOVEL BENZOPYRAN DERIVATIVES

BACKGROUND OF THE INVENTION

This invention relates to novel benzopyrans and to a process for their production.

SUMMARY OF THE INVENTION

The compounds of this invention have the formula

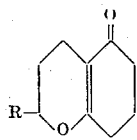

I wherein R is lower-alkyl, and to a process for the preparation of these compounds, wherein an alkyl vinyl ketone of the formula RCOCH=CH$_2$ (II) wherein R has the value given above is condensed in the absence of a condensation catalyst in the aqueous phase, with cyclohexane-1,3-dione, to produce 2-(3-oxo-alkyl)-cyclohexane-1,3-diones of the formula

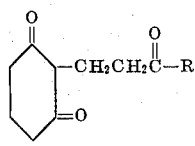

III wherein R has the value given above, and the thus-produced 2-(3-oxoalkyl)-cyclohexane-1,3-dione is then selectively reduced with keto reducing agent. The reaction mixture is then worked up in the usual manner, preferably after acidification.

DETAILED DISCUSSION

R in the above compounds contains one to six carbon atoms, e.g., methyl, ethyl, propyl, butyl. Preferred are those wherein R is methyl or ethyl.

The process of this invention is a two-stage process. In the first stage, lower-alkyl vinyl ketone is condensed with cyclohexane-1,3-dione. This addition reaction per se is known. However, according to conventional methods, the reaction is conducted in the presence of a basic catalyst. Thus, I.N. Nazarov and S.I. Zav'yalor (Isvest. Akd. Nauk SSSR, Otdel. Khim. Nauk 1957, 207; C.A. 51, 1957, 11302 a) describe the reaction of methyl vinyl ketone with cyclohexane-1,3-dione in an alkaline solution. In this reaction, the main reaction product is 2,2-bis(3-oxobutyl)-cyclohexane-1,3-dione, whereas the desired product, viz., 2-(3-oxobutyl)-cyclohexane-1,3-dione is isolated in a yield of only about 30 percent.

It has now been found that a high yield of the desired 2-(3-oxo-alkyl)-cyclohexane-1,3-dione can be obtained by the condensation of alkyl vinyl ketones with 1,3-cyclohexanedione in the aqueous phase in the absence of a reaction catalyst. The process of this invention produces the desired 2-(3-oxo-alkyl)-cyclohexane-1,3-dione in practically quantitative yield. Thus, expensive purification procedures, which are necessary, for example, in the process described by I.N. Nazarov et al., supra, are avoided.

This smooth, advantageous progression of the first reaction stage of the process of this invention is surprising because one skilled in the art knows that the addition of vinyl ketones to 1,3-diketones takes place in such a manner that the methylene group of the 1,3-diketone forms a carbanion in the presence of bases. Then, the positively charged terminal methylene group of the vinyl ketone is added to this carbanion. Thus, it could not be expected that the alkyl vinyl ketones would add to cyclohexane-1,3-dione in the absence of basic catalysts. Still less probable was the fact that the yield of 2-(3-oxoalkyl)-cyclohexane-1,3-dione would be about trebled.

In order to add the alkyl vinyl ketone to cyclohexane-1,3-dione, both components can be dissolved in water, the solution stored at room temperature for about 5-30 hours, and the reaction mixture worked up in the usual manner, e.g., by extracting the aqueous phase with an organic solvent, e.g., chloroform, and concentrating the organic phase under vacuum. Substantially pure 2-(3-oxoalkyl)-cyclohexane-1,3-dione is obtained as the distillation residue.

This simple method of preparation can, of course, also be varied, e.g., by conducting the reaction at an elevated temperature, but preferably not substantially above 60° C.; by adding a polar solvent to the reaction mixture, e.g., methanol or acetone, as a solubilizer; and by conducting the reaction in the absence of atmospheric oxygen so as to avoid undesired side reactions, for example, by storing the reaction mixture under an inert gas atmosphere, e.g., nitrogen.

The second stage of the process of this invention is the reduction of the thus-produced 2-(3-oxoalkyl)-cyclohexane-1,3-diones. Nothing has been known heretofore about this reduction. Since these compounds contain three keto groups, it would be expected that the reduction step would yield mixtures of various possible partial reduction products and/or the corresponding trihydroxy compound.

Surprisingly, this is not the case. Instead, 2-(3-oxo-alkyl)-cyclohexane-1,3-diones can be selectively reduced to the corresponding 2-(3-hydroxyalkyl)-cyclohexane-1,3-diones, with reducing agents customarily employed for the reduction of keto groups. The thus-formed 2-(3-hydroxyalkyl)-cyclohexane-1,3-diones then are directly rearranged, in the presence of acids, into the benzopyran derivatives of Formula I.

Examples of suitable reducing agents which can be employed for the selective reduction of 2-(3-oxoalkyl)-cyclohexane-1,3-diones are hydrogen in the presence of ordinary metal catalysts, e.g., Raney nickel, platinum oxide, or palladium catalysts, as well as the conventional metal hydrides, e.g., sodium borohydride and lithium aluminum hydride.

The reduction is preferably conducted in an alkaline solution, e.g., an aqueous or alcoholic solution of sodium hydroxide.

The benzopyran derivatives of Formula I can be produced in an almost quantitative yield by reducing the 2-(3-oxoalkyl)-cyclohexane-1,3-diones in an aqueous solution of alkali hydroxide, for example in sodium hydroxide solution with hydrogen and Raney nickel at 20°–100 °C. and a pressure of 1–100 atmospheres, and then acidifying the reaction mixture.

Another alternate method for preparing the benzopyran derivative of Formula I in an almost quantitative yield is the reduction of a 2-(3-oxoalkyl)- cyclohexane-1,3-dione with sodium borohydride at −20° to +50 °C.

Under these preferred conditions only the keto group of the side chain can be reduced, whereas the keto groups of the cyclohexane ring are not attacked. Therefor, an almost quantitative yield of the benzopyran derivatives of Formula I can be produced, even if the reduction is carried out with a large excess of the reducing agent hydrogen or sodium borohydride.

It is, of course, also possible to employ other metal hydrides in the reduction step, e.g., lithium aluminum hydride; however, these processes are more complicated and expensive than the reduction methods illustrated in examples herein.

The benzopyrans of Formula I are valuable intermediates for the synthesis of pharmacologically effective substances, especially steriod hormones of the androstane and pregnane series, especially the 19-nor-steroids.

As an example of the use of benzopyran derivatives of Formula I, described below is the synthesis of 4,9(10)-estradiene-3,17-dione, which compound is an important key substance for the preparation of numerous pharmacologically active steroids, e.g., estrone, estradiol, equilin, testosterone, 17α-ethynyl-19-nor-testosterone, etc. This compound can be prepared in a simple manner as follows:

2-Methyl-2,3,4,6,7,8-hexahydro-(5H)-benzopyran-5-one is converted, with a vinyl magnesium halide, into 5-hydroxy-2-methyl-5-vinyl-2,3,4,6,7,8-hexahydro-(5)-benzopyran, which, after the addition of 2-methyl-cyclopentane-1,3-dione and subsequent acid treatment, yields 3-methyl-4-oxa-5(10)8,14-estratrien-17-one. This compound is converted, by hydrogenation of the $\Delta^{14}$-double bond and subsequent isomerization of the $\Delta^8$-double bond with acid, into 3-methyl-4-oxa-5(10),9-estradien-17-one, which is converted, by chromic acid oxidation in an acidic solution, into 4,5-seco-9(10)-estrene-3,5,17-trione. This seco compound is cyclized with acid to produce 4,9(10)-estradiene-3,17-dione.

If, in place of 2-methyl-cyclopentane-1,3-dione, 2-ethyl-1,3-cyclopentanedione is employed, the homologous steroids bearing a 4-methyl group are obtained by employing the same method of synthesis.

Thus, reacting ethyl vinyl ketone with 1,3-cyclohexanedione produces 2-(3-oxo-n-pentyl)-1,3-cyclohexane-1,3-dione (Formula I, R = $C_3H_5$) which is reduced with sodium borohydride to 2-ethyl-2,3,4,6,7,8-hexahydro-(5H)-benzopyran-5-one. This compound is converted with a vinyl magnesium halide into 5-hydroxy-2-ethyl-5-vinyl-2,3,4,6,7,8-hexahydro-(5)-benzopyran which is also converted, in the manner described above, into 4-methyl-4,9(10)-estradiene-3,17-dione.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

2-(3-Oxobutyl)-cyclohexane-1,3-dione

Two hundred and fifty g. of resorcinol is hydrogenated to cyclohexane-1,3-dione in accordance with the literature (Org. Synth. Coll. Vol. III, p.278 [1955]) and then dissolved in 2,400 cc. of water. To this reaction solution is added 225 ml. of methyl vinyl ketone in 1,000 ml. of water and the clear solution is allowed to stand for 24 hours at room temperature under nitrogen. In order to remove the excess methyl vinyl ketone, the solution is agitated under vacuum at 30°–40°C., then saturated with sodium chloride, extracted with chloroform, and the organic phase is dried with sodium sulfate. After the solvent has been distilled off under vacuum, an oil is obtained in a quantitative yield; this oil is readily crystallized and, after recrystallization from ether, yields 2-(3-oxobutyl)-cyclohexane-1,3-dione, melting point 100°–104°C.

EXAMPLE 2

2-Methyl-2,3,4,6,7,8-hexahydro[5H]-benzopyran-5-one (a) Reduction with Sodium Borohydride A solution of 4.2 g. of crude 2-(3-oxobutyl)-cyclohexane-1,3-dione in 80 ml. of methanol and 20 ml. of 1N sodium hydroxide is cooled to −10° C. and mixed batchwise with 0.4 g. of sodium borohydride within one hour. Thereafter, the reaction mixture is agitated for one hour at −10° C. and for 1 hour at room temperature. Then, the mixture is gradually acidified to a pH of 5–6 with glacial acetic acid under cooling; then the solvent is extensively distilled off under vacuum, and, after the reaction mixture has been taken up in water, a pH of 1–2 is produced with concentrated hydrochloric acid. The solution is saturated with sodium chloride, shaken out with chloroform, and the organic phase is washed with solution of bicarbonate and water. After drying with sodium sulfate and distilling off the solvent under vacuum, a crude product is obtained yielding, after being distilled once under vacuum, 3.5 g. of pure crystalline 2-methyl-2,3,4,6,7,8-hexahydro-[5H]-benzopyran-5-one, m.p. 29°–30°C.

(b) Reduction by Catalytic Hydrogenation

Three hundred and thirty g. of crude 2-(3-oxobutyl)-cyclohexane-1,3-dione (produced in accordance with Example 1) is dissolved in 750 ml. of 10 percent sodium hydroxide solution, and the solution is hydrogenated in the presence of 75 g. of Raney nickel at 46° C. and 130 atmospheres gauge. After 4 hours, the absorption of hydrogen is practically complete. However, the reaction mixture is stirred for another 4 hours under the above-mentioned conditions. After separating the catalyst, the reaction solution is mixed with concentrated hydrochloric acid until a pH of 1–2 is reached, saturated with sodium chloride, and extracted with chloroform. The organic phase is washed with bicarbonate solution and water, dried with sodium sulfate, and evaporated. After distilling under vacuum, 290 g. of 2-methyl-2,3,4,6,7,8-hexahydro-[5H]-benzopyran-5-one is obtained, which compound is produced in the pure form and crystallizes when allowed to stand; m.p. 29°–30° C.

EXAMPLE 3

Converting of 2-methyl-2,3,4,6,7,8-hexahydro-(5H)-benzopyran-5-one to 4,9(10)-estradiene-3,17-dione and to estrone A solution of 40 g 2-methyl-2,3,4,6,7,8-hexahydro-(5H)-benzopyran-5-one in 200 ml of tetrahydrofuran is added to a vinyl magnesium chloride solution (obtained from 24 g magnesium turnings, 150 ml of tetrahydrofuran and vinyl chloride), which is cooled to −30 °C. Thereafter, the reaction mixture is agitated for 30 minutes and than worked up in the usual manner.

The 5-hydroxy-2-methyl-5-vinyl-2,3,4,6,7-hexahydro-(5H)-benzopryan obtained is dissolved without purification in 200 ml of toluene and than added to a boiling mixture of 28 g 2-methylcyclopentane-1,3-dione in 1,000 ml toluene. The mixture is boiled for 10 minutes and than worked up in the usual manner. There will be obtained 42 g of 3-methyl-4-oxa-8,14-seco-5(10),9(11)-estradiene-14,17-dione of the melting point 72°–73°C (after recrystallization from methanol).

The seco compound obtained is dissolved in 500 ml of benzene, 20 mg p-toluene sulfonic acid are added and the mixture boiled at a water separator for 15 minutes. 0.5 g of palladium calcium carbonate catalyst is added to the cooled mixture and the mixture is hydrogenated with the theoretical amount of hydrogen under normal pressure. Then, the catalyst is filtered off, the solution is evaporated under vacuum and the residue is subjected to chromatography on silica gel.

The 3-methyl-4-oxa-5(10),9(11)-estradiene-17-one such obtained is dissolved in 150 ml of dioxane, 15 ml of 2 n sulfuric acid are added and the mixture is refluxed. After complete reaction the mixture is poored into water, extracted with chloroform and the chloroform solution evaporated under vacuum to dryness. The crude residue is dissolved in 100 ml of acetone, 25 ml of Jones reagent (that is 8 n solution of chromic acid in aquous sulfuric acid) are added and the mixture reacted for 30 minutes. Thenthe mixture is poured into water, extracted with chloroform and the chloroform solution is concentrated under vacuum.

The 4,5-seco-9(10)-estrene-3,5,17-trione such obtained is dissolved in 75 ml of ethanol, 7.5 ml of 4 n sulfuric acid are added, the mixture is refluxed for one hour and than worked up in the usual manner.

The 4,9(10)-estradiene-3,17-dione such obtained is dissolved in 100 ml of methanol, 500 mg of palladium magnesium oxide catalyst are added and the mixture is refluxed for 3 hours. The catalyst is filtered off, the solution is concentrated under vacuum and the residue obtained is recrystallized from methanol. There are thus obtained 10.3 g estrone of the melting point 245°–247°C.

The preceding examples can be repeated with similar success by substituting the generically of specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A benzopyran of the formula

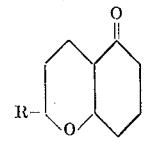

wherein R is lower-alkyl.

2. A compound of claim 1, 2-methyl-2,3,4,6,7,8-hexahydro-[5H]-benzopyran-5-one.

3. A process for the production of a benzopyran according to claim 1 which comprises the steps of condensing an alkyl vinyl ketone of the formula RCOCH=CH$_2$ wherein R is lower-alkyl, with cyclohexane-1,3-dione in the aqueous phase in the absence of a reaction catalyst, to produce a 2-(3-oxo-alkyl)-cyclohexane-1,3-dione of the formula

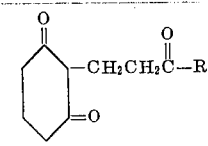

wherein R is lower-alkyl, and selectively reducing the thus-produced 2-(3-oxoalkyl)-cyclohexane-1,3-dione to produce a 2-lower-alkyl-2,3,4,6,7,8-hexahydro-[5H]-benzopyran-5-one.

4. A process according to claim 3 wherein the reduction is conducted with hydrogen in the presence of a metal hydrogenation catalyst.

5. A process according to claim 4 wherein the metal catalyst is Raney nickel.

6. A process according to claim 3 wherein the reduction is conducted with a metal hydride.

7. A process according to claim 6 wherein the metal hydride is sodium borohydride.

8. A process according to claim 3 wherein the reduction is conducted in an alkaline solution.

* * * * *